US012779779B2

(12) United States Patent
Crane et al.

(10) Patent No.: US 12,779,779 B2
(45) Date of Patent: Nov. 3, 2026

(54) METHOD AND SYSTEM FOR GENERATING A THREE-DIMENSIONAL OBJECT WITH EDGE DEFINITION

(71) Applicant: Brigham Young University (BYU), Provo, UT (US)

(72) Inventors: Nathan Brad Crane, Vineyard, UT (US); Clinton Spencer Abbott, Nampa, ID (US)

(73) Assignee: Brigham Young University (BYU), Provo, UT (US)

( * ) Notice: Subject to any disclaimer, the term of this patent is extended or adjusted under 35 U.S.C. 154(b) by 245 days.

(21) Appl. No.: 18/708,540

(22) PCT Filed: Nov. 10, 2022

(86) PCT No.: PCT/US2022/079673
§ 371 (c)(1),
(2) Date: May 8, 2024

(87) PCT Pub. No.: WO2023/086908
PCT Pub. Date: May 19, 2023

(65) Prior Publication Data

US 2025/0001680 A1 Jan. 2, 2025

Related U.S. Application Data

(60) Provisional application No. 63/277,653, filed on Nov. 10, 2021.

(51) Int. Cl.
*B29C 64/165* (2017.01)
*B29C 64/273* (2017.01)
*B33Y 10/00* (2015.01)

(52) U.S. Cl.
CPC .......... *B29C 64/165* (2017.08); *B29C 64/273* (2017.08); *B33Y 10/00* (2014.12)

(58) Field of Classification Search
CPC .......... B22F 10/14; B22F 10/50; B22F 10/68; B22F 2999/00; B22F 12/43; B29C 64/165; B29C 64/30; B29C 64/273; B33Y 40/00; B33Y 10/00; Y02P 10/25
See application file for complete search history.

(56) References Cited

U.S. PATENT DOCUMENTS

2016/0229128 A1 8/2016 Dayagi et al.
2016/0263828 A1 9/2016 Ederer et al.
2019/0091766 A1 3/2019 Kasperchik et al.
2019/0210277 A1 7/2019 Sachs et al.
2021/0252780 A1 8/2021 Tenhouten et al.

OTHER PUBLICATIONS

International Search Report and Written Opinion for PCT Application No. PCT/US2022/079673, mailed on Feb. 17, 2023, 7 pages.

*Primary Examiner* — Monica A Huson
(74) *Attorney, Agent, or Firm* — Brake Hughes Bellermann LLP

(57) ABSTRACT

A method of forming a three-dimensional (3D) object, the method including forming a layer of powder, dispensing a volatile fluid on the layer of the powder, vaporizing the volatile fluid by applying an energy beam to form a trench that defines a boundary of a 3D object powder layer of the 3D object, the 3D object powder layer corresponding to a portion of the layer of the powder defined by the boundary, and adding a binder to the 3D object powder layer.

20 Claims, 15 Drawing Sheets

900

METHOD AND SYSTEM FOR GENERATING A THREE-DIMENSIONAL OBJECT WITH EDGE DEFINITION

CROSS-REFERENCE TO RELATED APPLICATION

This application is a 35 U.S.C. § 371 National Phase Entry Application from PCT Application No. PCT/US2022/079673, filed on Nov. 10, 2022, entitled "METHOD AND SYSTEM FOR GENERATING A THREE-DIMENSIONAL OBJECT WITH EDGE DEFINITION", and designating the U.S., which claims priority to and the benefit of U.S. Provisional Application No. 62/277,653, filed on Nov. 10, 2021, the entire disclosures of which are incorporated herein by reference for all purposes.

NOTICE OF GOVERNMENT-SPONSORED RESEARCH

This invention was made with Government support under grant contract number CMMI-1946724 awarded by the National Science Foundation. The Government has certain rights in the invention.

FIELD

This description generally relates to methods, devices, and algorithms used to deposit and evaporate a fluid on a boundary region of an object in a powder bed when fabricating objects using additive manufacturing.

BACKGROUND

Additive manufacturing (AM) is a process of making an object from three-dimensional (3D) data by joining materials, typically a layer at a time, building up to the 3D object. The 3D object may be based on a 3D model, which may have been scanned from an existing object or generated using computer modeling software. The 3D model may then be transformed into the layers that make up the 3D object. After the layers are deposited, bonded, cured and/or cooled, the finished 3D object is formed. Additional treatments may be required to improve the properties and prepare the object for use.

SUMMARY

The methods and systems for generating three-dimensional (3D) objects with edge definition disclosed herein may introduce a volatile material, such as, for example, an aqueous solution that penetrates the powder disposed on the powder bed. The volatile material may be patterned, but may also be distributed uniformly over the entire powder bed. A localized energy source may be applied along the boundaries between a contour of a layer of the 3D object and the excess powder bed. The localized energy source may provide sufficient energy to rapidly vaporize the volatile material. The sudden expansion of the volatile material may exert a force on the powder particles that ejects them from the boundary area to create a trench between the contour of the 3D object layer and the excess powder.

In one general aspect, there is provided a method of forming an object, the method including forming a layer of powder, dispensing a volatile fluid on the layer of the powder, vaporizing the volatile fluid by applying an energy beam to form a trench that defines a boundary of a 3D object powder layer of the object, the 3D object powder layer corresponding to a portion of the layer of the powder defined by the boundary, and adding a binder to the 3D object powder layer.

In another general aspect, there is provided a method of forming an object, the method including forming a layer of powder, dispensing a binder on the layer of the powder, and vaporizing a portion of the binder by patterning an energy beam to form a trench that defines a boundary of a 3D object powder layer of the object, the 3D object powder layer corresponding to a portion of the layer of the powder defined by the boundary.

In another general aspect, there is provided a method of forming an object, the method including forming a first layer of powder, dispensing a first portion of a binder on the first layer of the powder, vaporizing a portion of the first portion of the binder by patterning an energy beam to form a first trench that defines a first boundary of a first 3D object powder layer of the object, the first 3D object powder layer corresponding to a portion of the first layer of the powder defined by the first boundary, forming a second layer of the powder over an upper surface of the first layer of the powder, dispensing a second portion of the binder on the second layer of the powder, vaporizing a portion of the second portion of the binder by patterning another energy beam to form a second trench that defines a second boundary of a second 3D object powder layer of the object, the second 3D object powder layer corresponding to a portion of the second layer of the powder defined by the second boundary, and forming the 3D object based on fusing the first 3D object powder layer and the second 3D object powder layer.

In another general aspect, there is provided a method of forming an object, the method including: forming a layer of powder, dispensing a pigment on the layer of the powder, vaporizing a portion of the pigment by patterning an energy beam to form a trench that defines a boundary of a 3D object powder layer of the object, the 3D object powder layer corresponding to a portion of the layer of the powder defined by the boundary, and applying energy to the pigment on the 3D object powder layer to fuse the 3D object powder layer and form a 3D object layer.

The details of one or more implementations are set forth in the accompanying drawings and the description below. Other features will be apparent from the description and drawings, and from the claims.

DETAILED DESCRIPTION

Figure 1:
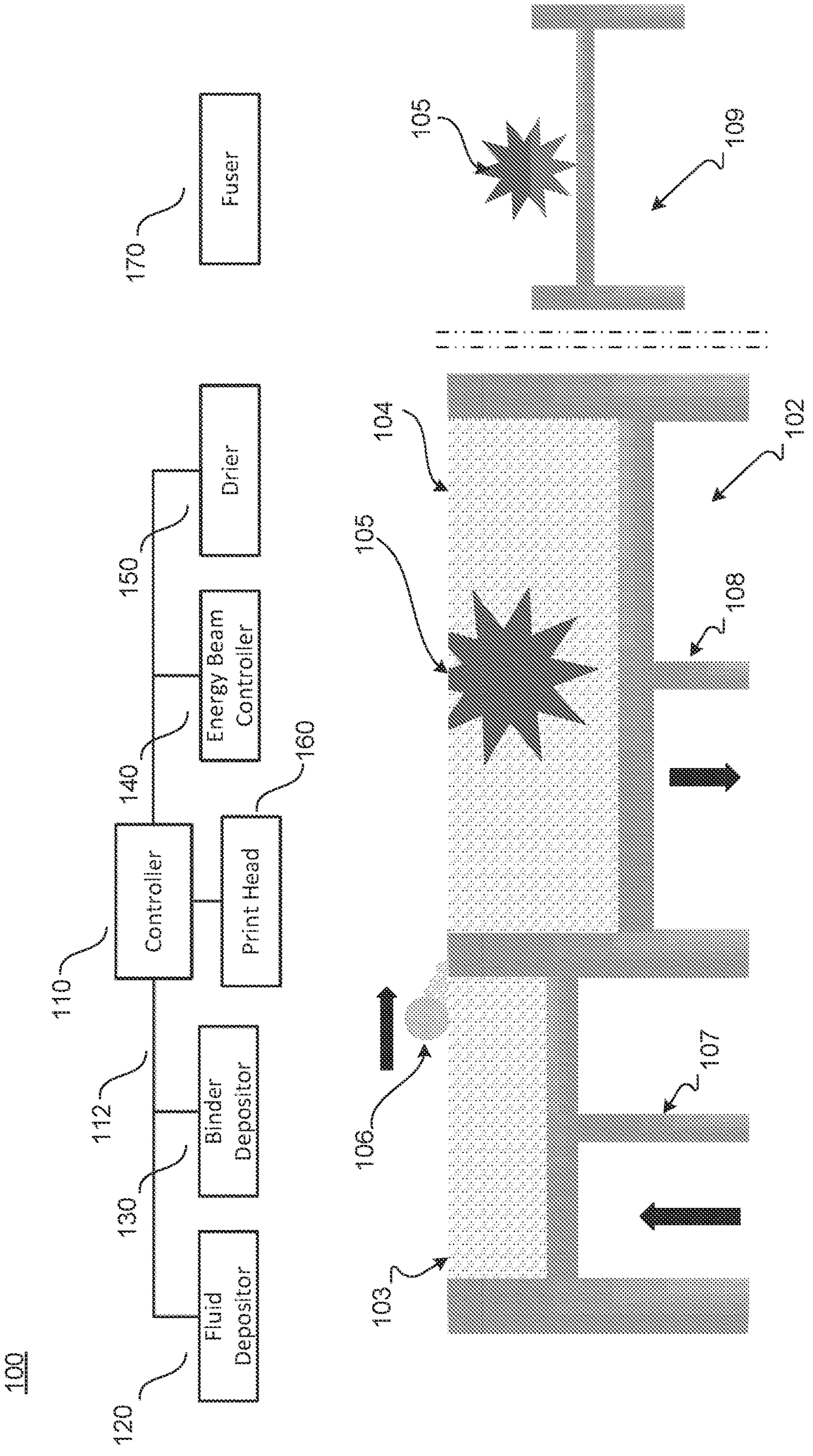
FIG. 1 illustrates an example of an additive manufacturing (AM) system.

Powder bed fabrication is an additive manufacturing (AM) technique based on binding particles of a powder to form a 3D object within the powder bed. The implementations described herein can be used with a variety of AM processes. For example, the implementations described herein can be used with binder jetting, which is an AM process in which a printhead selectively deposits a binder material onto a thin layer of powder particles. The powder particles, such as, foundry sand, ceramics, metal, polymers, and/or composites, can be spread into a layer on the powder bed. The binder material, for example, a liquid binder, may be deposited into the powder to bind the powder together to build a layer of the 3D object. In some implementations, the binder material may be deposited in a predetermined pattern (e.g., in a cross-sectional shape of the 3D object) to successive layers of powder in a powder bed such that the powder particles bind to one another where the binder material is located. This process is repeated layer by layer, using a map from a 3D model file, until the 3D object is complete. In some examples, the 3D object may be formed in a single layer, instead of the multi-layer process. The 3D object may then be processed further into a finished 3D object. For example, excess, unbound powder may be removed from the powder bed. Then, the 3D object may be heated in a furnace to remove the binder material or sintered to form the finished 3D object.

Like binder jetting, several types of additive manufacturing processes, which can be used in the implementations herein, spread thin layers of powder. These powder layers may be patterned to define the region of geometry that will form the 3D object. This can be done either by scanning an energy beam over the part (e-beam, laser) or by inkjet printing that uses an active agent that glues the powder together (binder jetting) or by increasing absorption of a broad energy source.

The implementations described herein form the boundary of the 3D object with a sharp delineation between the 3D object and the surrounding layer. The implementations described herein can avoid bonding of adjacent powder particles to the printed region of the 3D object when heat is applied. In the case of binder jetting, the implementations described herein may remove roughness that arises from misplacement of individual binder droplets or of irregular infiltration of the binder into the powder layer. The implementations described herein can avoid increased surface roughness and may also prevent undesirable changes in the 3D object geometry. The implementations described herein avoid problems that may arise when scanning a laser or other energy beam over the surface to directly melt the powders.

The methods and systems for generating three-dimensional object (3D) with edge definition disclosed herein are less costly, more accurate, and more reliable than the current additive manufacturing (AM) methods. For example, the implementations described herein, energy is conserved because an energy beam with sufficient energy to melt the powder, which may be costly, is not needed.

For the implementations described herein, cooling of the heated powder may not be needed, therefore variations in cooling that may cause significant variations in the final part quality, which are difficult to predict and adjust for, are not encountered.

Also, the implementations described herein are cost effective because the increase in production is not dependent on increasing the number of nozzles for the patterning process of ink jet printing. The implementations described herein are cost-effective because an increased size of the printhead systems, which may contribute to a significant portion of a machine's cost and may be prone to degradation and maintenance issues (such as clogging), may not be needed.

The methods and systems for generating the 3D object with edge definition disclosed herein may introduce a volatile material, such as, for example, an aqueous solution that penetrate the powder disposed on the powder bed. In some examples, the volatile material may be patterned, but may also be distributed (e.g., uniformly distributed, substantially uniformly distributed, distributed in a pattern, distributed in sections) over at least a portion (e.g., the entire) powder bed. A localized energy source may be applied along the boundaries between a contour of a layer of the 3D object and the excess powder bed. The localized energy source may provide sufficient energy to rapidly (e.g., within microseconds, within milliseconds, within seconds) vaporize the volatile material. The sudden expansion of the volatile material may exert a force on the powder particles that ejects them from the boundary area to create a trench between the contour of the 3D object layer and the excess powder bed. This can be accomplished without heating the powder so as to melt it, thereby, saving on the energy cost to heat and then cool the powder bed. In other words, the level of energy (e.g., temperature) used to cause the volatile material to eject powder particles, is lower than the level of energy to fuse (e.g., melt) powder particles.

In some examples, after the trench is formed, the remaining volatile fluid may be removed by evaporation and the interior of the trench may be fused by scanning with another localized energy source, such as a laser with a different power rating. Thus, the edge definition and surface finish for the 3D object may be improved by melting a thin surface layer of the powder on the edge of the trench.

The methods and systems for generating the 3D object with edge definition disclosed herein may improve part dimensional accuracy and surface finish by creating a better-defined boundary between part cross-sections and the remainder of the powder layer. The methods and systems described herein may also enable faster processing due to the ability to quickly scan the localized energy source compared to alternatives of using a physical cutting tool to remove the material on the edges of the 3D object. The methods and systems described herein may produce less wear over time than when using a physical cutting tool. The methods and systems described herein may also eliminate costly inkjet printing equipment in a binder jetting and/or multi-jet fusion process. This may be accomplished by depositing a binder, energy absorbing fluid, or radiation absorber uniformly across the part and utilizing the scanning energy source to create trenches to define the part and to allow for the regions outside the part to be readily separated into smaller pieces that can be easily separated from the part after curing of the binder or fusing of the powder.

FIG. 1 illustrates an example of an additive manufacturing (AM) system 100 that includes a powder supply 103, a spreader 106 (e.g., a roller) configured to be movable across powder bed 104 of a build box system 102, a print head 160 that is movable across the powder bed 104, and a controller 110 in operable communication (e.g., wireless, wired, Bluetooth, etc.) with a fluid depositor 120, a binder depositor 130, an energy beam controller 140, a drier 150, a print head 160, and/or a fuser 170. Powder bed 104 may comprise powder particles, such as, for example, micro-particles of a metal, micro-particles of two or more metals, or a composite of one or more metals and other materials, such as ceramics and polymers. The spreader 106 may be movable across the powder bed 104 to spread a layer of powder, from the powder supply 103, across the powder bed 104.

Figure 5:
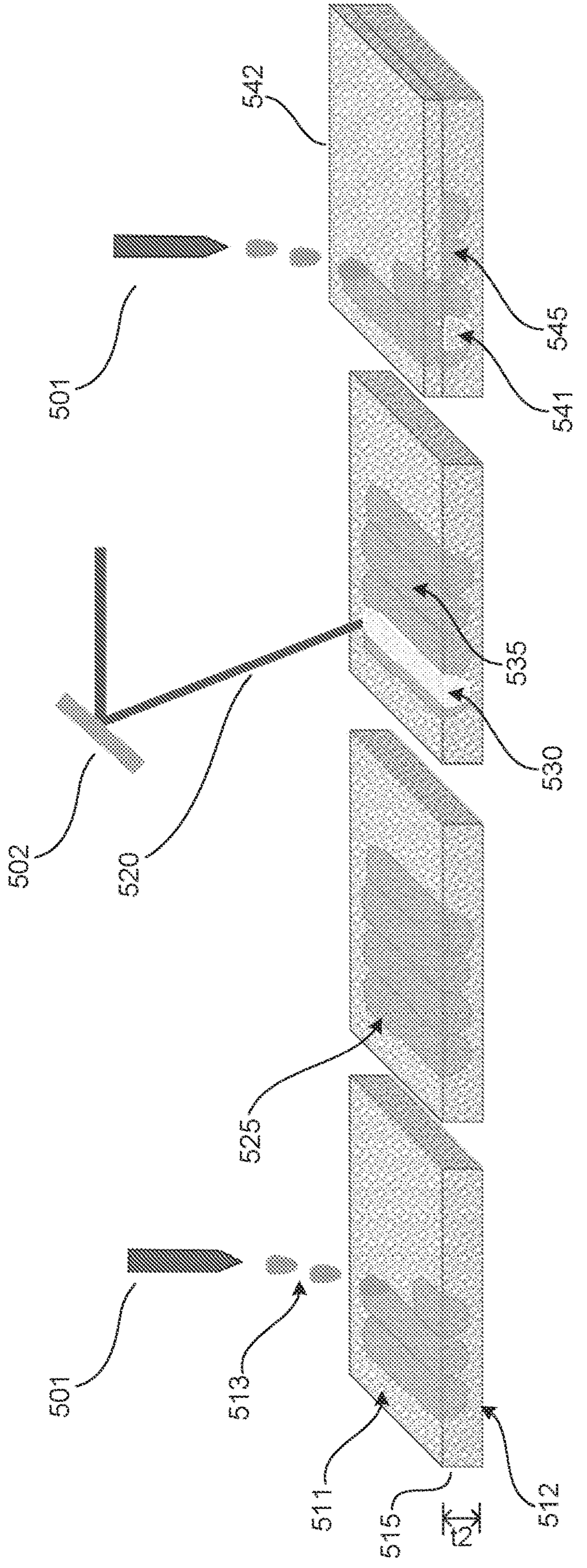
FIG. 5 is a diagram illustrating an example of a method of manufacturing a 3D object, in accordance with implementations described herein.

In some examples, the print head 160 may be actuated to dispense a binder material through operable communication with the binder depositor 130 and the controller 110. In some embodiments, the binder material may be one or more fluids configured to bind together powder particles. For example, as illustrated in FIG. 5, a nozzle 501 of the print head 160 may be actuated to dispose a small amount of binder 513 on the upper surface 511 of the layer of powder 515 on the powder bed 104. In some examples, the binder 513 dispensed by the print head 160 may penetrate at least one layer thickness, i.e., t2, of the layer of powder 515 that is spread on the powder bed 104.

In some examples, the controller 110 may actuate the print head 160 to deliver binder material from the print head 160 to successive layers of the powder in a predetermined two-dimensional pattern, as the print head 160 moves across the powder bed 104. In some examples, the movement of the print head 160 and the actuation of the print head 160 to deliver the binder material, may be coordinated with movement of the spreader 106 across the powder bed 104. For example, the spreader 106 may spread a layer of the powder across the powder bed 104, and the print head 160 may deliver the binder in a predetermined, two-dimensional pattern, to the layer of the powder spread across the powder bed 104, to form a layer of one or more 3D objects 105. These steps may be repeated (e.g., with the predetermined two-dimensional pattern for each respective layer) in sequence to form subsequent layers until the one or more of the 3D objects 105 are formed in the powder bed 104.

In some examples, the print head 160 may be actuated to dispense a volatile material, such as a volatile fluid through operable communication with the fluid depositor 120 and the controller 110. In some examples, the volatile material may be an aqueous solution that penetrates the powder on the powder bed 104 to a desired depth (e.g., a portion of a depth of the powder of the powder bed 104, an entirety of a depth of the powder of the powder bed 104). In some examples, the controller 110 may actuate the print head 160 to deliver volatile fluid from the print head 160 to successive layers of the powder in a predetermined two-dimensional pattern, as the print head 160 moves across the powder bed 104. In some examples, the volatile material may be patterned, and in other examples, the volatile material may also be distributed uniformly over the entirety of the powder bed 104. In some examples, the movement of the print head 160 and the actuation of the print head 160 to deliver the volatile material, may be coordinated with movement of the spreader 106 across the powder bed 104. For example, the spreader 106 may spread a layer of the powder across the powder bed 104, and the print head 160 may deliver the volatile material in a predetermined, one-dimensional or two-dimensional pattern or entirely over the powder on the powder bed 104, to the layer of the powder spread across the powder bed 104, to form a layer of one or more 3D objects 105. These steps may be repeated in sequence to form subsequent layers until the one or more of the 3D objects 105 are formed in the powder bed 104.

In some examples, the energy beam controller 140 may be operatively connected to the controller 110. In some examples, as further illustrated in FIGS. 2-7, the energy beam controller 140 may apply a localized energy source along the boundaries between a contour of a layer of the 3D object and the excess powder bed. The localized energy source may provide sufficient energy to rapidly (e.g., within milliseconds, within seconds) vaporize the volatile material. The sudden expansion of the volatile material may exert a force on the powder particles that ejects them from the boundary area to create a trench, for example, trench 330, trench 530, and trench 730 between the contour of the 3D object layer and the excess powder bed. This can be accomplished without heating the powder so as to melt it. The properties of the powder particles may be preserved as the powder is not melted. Thus, the surrounding powder and ejected powder may be reused (e.g., reused in other layers). Moreover, energy cost to heat and then cool the powder bed may be saved. In other words, the level of energy (e.g., temperature) used to cause the volatile material to eject powder particles, is lower than the level of energy to fuse (e.g., melt) powder particles. Further details regarding the application of the energy beam controller 140 are provided below.

In some examples, the drier 150 may be actuated through operable communication with the controller 110. In some examples, the drier 150 may produce heat or light to dry the binder material on a layer of the build material disposed on the powder bed 104 through operable communication with the controller 110. In some examples, the drier 150 may be a heat source, such as, for example, a heat lamp. In some examples, the drier 150 may be a light source, such as, for example, a projector or a light bulb.

In some examples, the build material, i.e., powder, such as, for example, metallic powder, micro-particles of a metal, micro-particles of two or more metals, a composite of one or more metals and other materials, such as ceramics and polymers, and/or polymers is delivered from the powder supply 103 to the powder bed 104 and spread in successive layers. In some examples, the binder material may be, such as, for example, an aqueous fluid, a polymer-containing fluid, a pigment, a dye, and/or an ink that may be deposited from the print head 160 onto a layer of the build material disposed on the powder bed 104 and may be absorbed into the layer of the build material. In some examples, the binder may be an energy absorbing fluid or a radiation absorber. In an example, the energy absorbing fluid may be an ink or pigment that absorbs heat at a greater rate than a surface of the layer of powder. In some examples, the binder may be an aqueous solution including black ink. In some examples, the volatile material may be a liquid or fluid such as, for example, water, solvent, aqueous solution, or other liquid that penetrate the pore spaces between the particles of powder disposed on the powder bed.

In some examples, the fuser 170 (e.g., a sinterer) may include a furnace 109 and may heat or sinter the build material of the layers of the 3D object 105. In some examples, the fuser 170 may include a shaping station to shape the printed object and a debinding station to treat the printed object to remove binder material from the build material. Various other sub-systems, such as, for example, a de-powdering subsystem, a curing subsystem may be included without deviating from the spirit and scope of the illustrative examples.

As shown in FIG. 1, a build box system 102 may be movable and may be selectively attached to one or more components of the AM system 100, such as, the powder supply 103 and/or the fuser 170. In some examples, build box system 102 may be coupled or couplable to a movable assembly. In another example, a conveyor (not shown) may help transport the 3D object 105 between portions of AM system 100.

The controller 110 may include one or more processors, which may be formed in a substrate configured to execute one or more machine executable instructions or pieces of software, firmware, or a combination thereof. In some examples, the processor(s) are included as part of a system on chip (SOC). The processor(s) may be semiconductor-based that include semiconductor material that can perform digital logic. The processor may include CPUs, GPUs, and/or DSPs, just to name a few examples. The processor(s) may include microcontrollers, which is a subsystem within the SOC and can include a process, memory, and input/output peripherals. In some examples, the controller 110 includes one or more applications, which can be stored in a memory device, and that, when executed by the controller 110, perform certain operations.

In some examples, the controller 110 may be configured to receive instructions to form the 3D object and may control one or more of the fluid depositor 120, the binder depositor 130, the energy beam controller 140, the drier 150, the print head 160, and the fuser 170. In some examples, the controller 110 may be configured to instruct one or more of the fluid depositor 120, the binder depositor 130, the energy beam controller 140, the drier 150, the print head 160, and the fuser 170 to form the 3D object and to receive and process information from the one or more components of the AM system 100.

In some examples, a user interface (not shown) may be operably connected to the controller 110. In some examples, a network 112 may provide a data transfer connection between the various components, i.e., the fluid depositor 120, the binder depositor 130, the energy beam controller 140, the drier 150, the print head 160, and the fuser 170 for the transfer of data such as, for example, geometries, specifications regarding the printing material, one or more support and/or support interface details, specifications regarding the binder materials, specifications regarding the volatile material, pattern and duration for the energy beam controller, drying times and temperatures, heating or sintering times and temperatures, etc., for one or more 3D objects that are to be created.

In some examples, the AM system 100 may comprise a powder supply actuator mechanism 107 that elevates the powder supply 103 as the spreader 106 layers the powder across the powder bed 104. Similarly, the build box system 102 may comprise a build box actuator mechanism 108 that lowers the powder bed 104 incrementally as each layer of powder is distributed across the powder bed 104.

Although the example illustrated in FIG. 1 is a single 3D object 105 being printed, it should be understood that the powder bed 104 may include more than one 3D object 105 in embodiments in which more than one 3D object 105 is printed at once. Further, the powder bed 104 may be delineated into two or more layers, stacked vertically, with one or more objects disposed within a layer.

In other examples, layers of powder may be applied to powder bed 104 by a hopper (e.g., a metering device) followed by a spreading device (for example a roller). The hopper may move across powder bed 104, depositing powder along the way. The compaction roller may be configured to follow the hopper, spreading the deposited powder to form a layer of powder.

Figure 2:
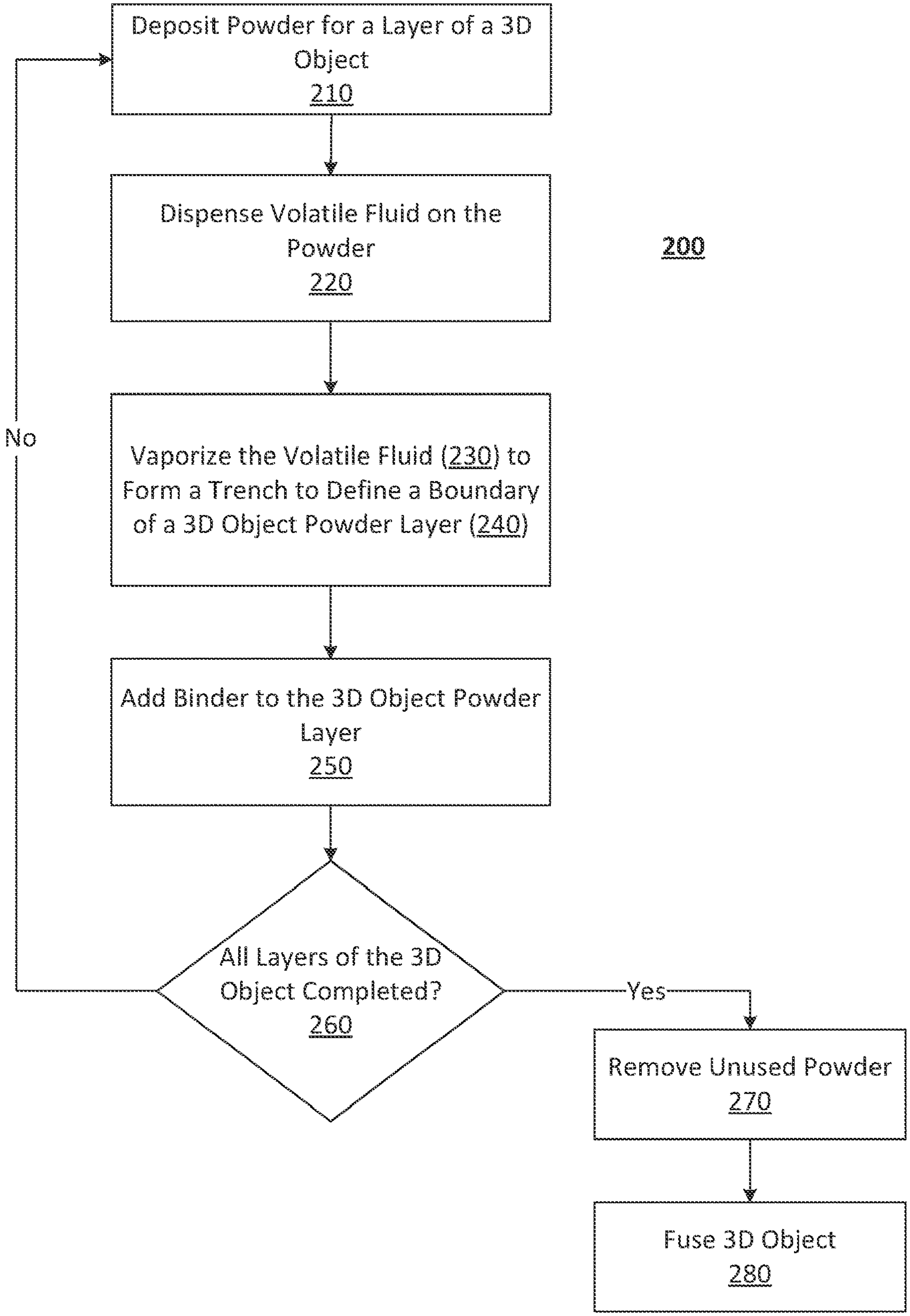
FIG. 2 is a diagram illustrating an example of a method of AM manufacturing, in accordance with implementations described herein.
Figure 3:
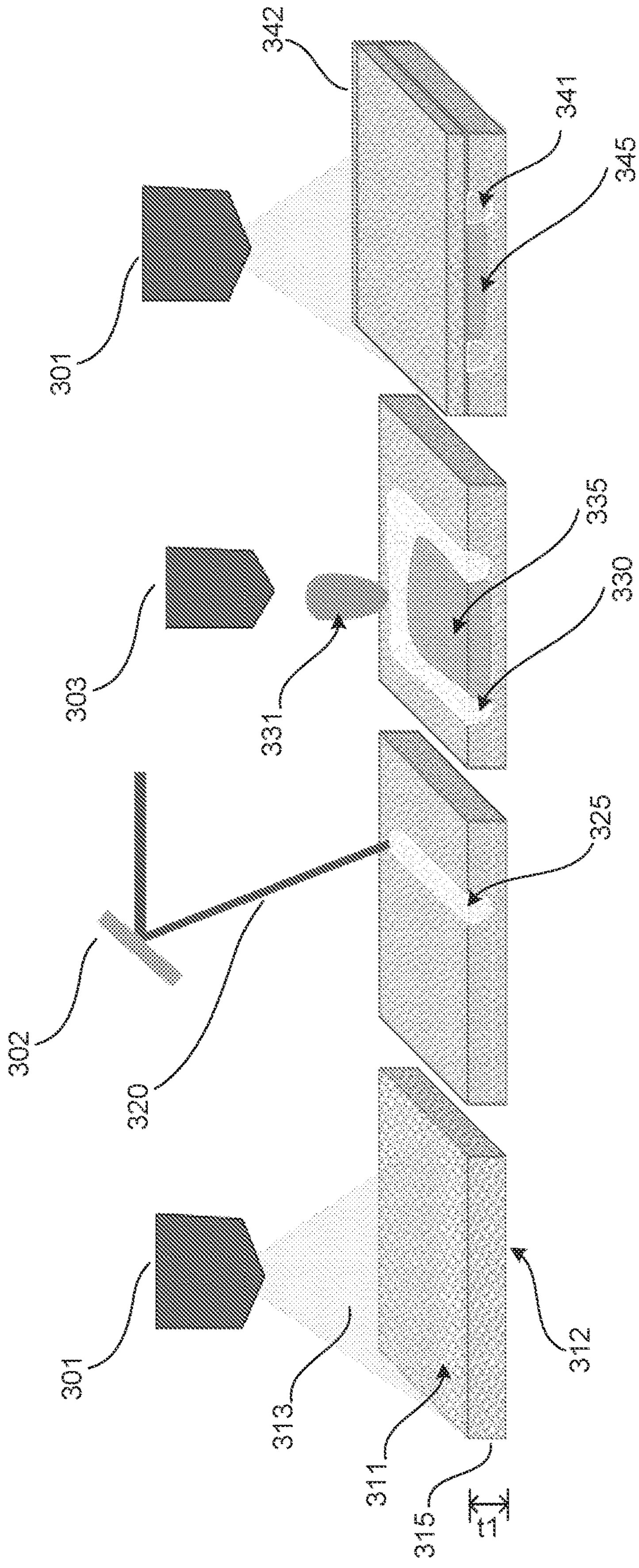
FIG. 3 is a diagram illustrating an example of a method of manufacturing a three-dimensional object (3D) object, in accordance with implementations described herein.

FIG. 2 is a diagram illustrating an example of an AM manufacturing method 200, in accordance with implementations described herein. FIG. 3 is a diagram illustrating an example of the layers of the 3D object and the method of manufacturing the 3D object illustrated in FIG. 2. The method of FIG. 2 may be described in combination with the layers of the 3D object illustrated in FIG. 3. Although FIG. 2 illustrates an example of operations in sequential order, it will be appreciated that this is merely an example, and that additional or alternative operations may be included. Further, the operations of FIG. 2 and related operations may be executed in a different order than that shown, or in a parallel or overlapping fashion. Descriptions of many of the operations of FIG. 1 are applicable to similar operations of FIG. 2, thus these descriptions of FIG. 1 are incorporated herein by reference. These descriptions may not be repeated for brevity.

In operation 210, the spreader 106 may spread a layer of powder 315, from the powder supply 103, across the powder bed 104. The layer of powder may have an upper surface 311 and a lower surface 312, and a thickness of the layer of powder may be t1. In an example, the powder bed 104 may be misted with an aqueous solution before spreading the layer of powder 315.

In operation 220, a small amount of volatile material 313 is disposed on the upper surface 311 of the layer of powder 315 on the powder bed 104. In some examples, the volatile material 313 may penetrate at least one layer thickness, i.e., t1, of the layer of powder 315 that is spread on the powder bed 104. In some examples, the volatile material 313 may penetrate exactly one layer thickness, i.e., t1, of the layer of powder 315 that is spread on the powder bed 104. In some examples, the volatile material 313 is a liquid that will wet to the layer of powder 315. In some examples, the volatile material 313 may concentrate at the contact points between adjacent powder particles. In some examples, the volatile material 313 may be water, solvent, aqueous solution, or other liquid that may either decompose or vaporize at a low enough temperature that the surrounding powder is not melted or damaged. In some examples, the volatile material 313 may be a fluid in vapor form, such as a gas. When the volatile material 313 is passed over (or down through) the powder bed, the volatile material 313 may condense into the spaces between the particles.

Although not shown in the figures, in some examples, the volatile material 313 may be mixed with the powder (before any is powder is provided to the powder bed 104). The entire mixture in the powder supply 103 may be a pre-mixed mixture of powder and volatile material. The pre-mixed mixture from the powder supply 103 may be provided to the powder bed 104 in a pre-mixed state. In some examples, both the powder and the volatile material 313 that are mixed may be in a solid state. In some examples, the powder of the mixture may be in a solid state and the volatile material 313 may be in a fluid state. In such examples, operation 220 of dispensing the volatile material 313 may not be performed because the volatile material 313 is already present in the pre-mixed material provided to the powder bed 104.

In some examples, the volatile material 313 may be disposed by being sprayed on by a sprayer 301. In some examples, the sprayer 301 may be a nozzle of the print head 160.

In some examples, the volatile material 313 may be introduced on the upper surface 311 of the layer of powder 315 by creating a fine mist of droplets, such as by ultrasonic atomization or other methods of generating a fine mist. In some examples, the mist of the volatile material 313 may be directed toward a surface of the powder bed 104. In some examples, the mist of the volatile material 313 may be distributed over the powder bed by moving the sprayer 301, i.e., the source of the mist relative to the powder bed 104. In some examples, a one-dimensional or a two-dimensional array of sources may be used to allow very rapid and uniform application of the volatile material 313. In another example, the volatile material 313 may be introduced in a vapor form and allowed to condense on the upper surface 311 region of the layer of powder 315.

In some examples, the volatile material 313 may be evaporated and transported into the vapor phase to the powder bed 104. The air around the powder on the powder bed 104 may draw the vapor of the volatile material 313 over (parallel to the top surface) or through (normal to the top surface) the powder bed 104. In some examples, the vapor may then condense in the powder on the powder bed 104—especially if the powder bed is cooler than the vapor that is passing over it.

In some examples, the volatile material 313 may be patterned, and in other examples, the volatile material may also be distributed uniformly over the entirety of the powder bed 104. In some examples, the volatile material 313 may be patterned on the upper surface 311 of the layer of powder 315 to define a boundary region 325 of a 3D object powder layer 335 of the 3D object 105. The boundary of the 3D object powder layer may be based on a 3D model of the 3D object 105 that is being created. The 3D object 105 may be divided into a number of layers that makeup the 3D object 105. Each layer of the 3D object may be referred to as the 3D object layer. The 3D object powder layer may be a layer of powder on the powder bed 104, such as for example, layer of powder 315 or layer of powder 342 in FIG. 3, which is transformed to a corresponding 3D object layer that collectively make up the 3D object. Thus, according to examples, an area of the volatile material 313 may be less than an area of the layer of powder 315 or may be of the same size. In some examples, the 3D object may be formed in a single layer, instead of the multi-layer process described above. In some implementations, when a 3D object is formed in a single layer, it can be referred to as a 2D object. Although discuss in terms of 3D objects, the techniques and examples herein can be applied to 2D objects. In many of the implementations, a 2D object can be formed by terminating the processes after just a single powder layer.

In some examples, electrospray techniques, such as dispersing solid materials in a liquid matrix that evaporates during deposition, may be used to improve the uniformity and coverage of the volatile material 313. When solid materials dispersed in a liquid matrix that evaporates during deposition is used as the volatile material 313, the solid residue may be a volatile material that generates gas upon heating.

In operation 230, a focused energy beam 320 may be scanned over the boundary region 325 of the 3D object powder layer of the 3D object. In some examples, the focused energy beam 320 may quickly convert the volatile material 313 to a gas. The rapid gas formation generates a force on the particles of the layer of powder 315 in the boundary region 325 that ejects them from the boundary region 325.

In some examples, the focused energy beam 320 is a tightly focused beam, such as a laser beam, so that the affected area is minimized. In some examples, the focused energy beam 320 is created using a diode laser in a pulsed mode. In an example, the input power of the laser may be 7000 mW (7 W) and the output power may be 2500 mW (2.5 W). In some examples, the wavelength of the pulsed laser may be 450 nm, the input voltage may be 12V, and the optical output of the energy source 302 is manipulated by pulse width modulation (PWM).

In some examples, the focused energy beam 320 may be scanned by mechanically moving the powder bed 104 and/or energy source to achieve relative motion. In some examples, the focused energy beam 320 may be scanned by using a mirror system 302 such as a galvanometer to steer an energy beam over the powder bed 104. In the case of an electron beam, the focused energy beam 320 may be scanned using electrical fields to steer the beam.

In some examples, the energy source for the focused energy beam 320 may be continuous. In some examples, the energy source for the focused energy beam 320 may be pulsed. In some examples, the pulsed source may be effective because the short pulse of heat may more readily vaporize the volatile material 313 with any excess heat being dissipated to the surrounding powder in the layer of powder 315 with minimal net heating.

In some examples, one-dimensional or two-dimensional array of energy sources 302 that are either stationary or translating relative to the powder bed 104 may be used to produce the focused energy beam 320. Such a configuration may be selectively illuminated to vaporize the volatile material in select locations. The use of a large array may improve performance and/or reduce costs.

In some examples, the focused energy beam 320 may be absorbed by the volatile material 313 to minimize heating of the powder on the powder bed 104. In some examples, the volatile material 313 is a fluid that is miscible with a second fluid, such as a binder 331 or dopant.

In operation 240, the vaporization of the volatile material 313 creates a trench 330, i.e., a physical gap between the region of the powder bed layer that will form the 3D object powder layer and the excess powder in the layer of powder 315 over the rest of the powder bed 104. In some examples, a depth of the trench 330 may be equal to t1, i.e. the depth of the layer of powder 315 that is spread on the powder bed 104. In some examples, the depth of the trench 330 may be substantially equal to t1, i.e. the depth of the layer of powder 315 that is spread on the powder bed 104. In some examples, if the powder of the powder bed 104 is melted or fused, the trench 330 may ensure that adjacent powder is not incorporated into the surface of the 3D object layer, thereby improving the 3D object's dimensional accuracy and/or surface finish.

If the powder of the 3D object powder layer is subsequently to be patterned with a second fluid, the gap assures that the second fluid may not flow beyond the intended boundary, i.e., trench 330. This may reduce the need for accurate control over the volume of dispensed second fluid and may obviate the need for accurate placement of the droplet of the binder 331. Thus, the trench 330 provides for dispensing a second fluid with lower-cost systems that produce large droplets or streams, and the second fluid may spread until it encounters the trench 330 created by the expelled powder.

In operation 250, binder 331 may be added as large droplets in approximately a center of 3D object powder layer 335. The 3D object powder layer 335 may be defined by the trench 330. In some examples, the nozzle or droplet 303 may dispense the binder 331. In an example, the binder 331 may fuse or harden the 3D object powder layer 335 to form the 3D object layer 345. In an example, the binder 331 may bind (e.g., glue, hold) the powder within the trench 330 to form the 3D object layer 345 from the 3D object powder layer 335.

In an example, the volatile material 313 may be such that it does not leave any residue behind after vaporization, thus supporting recycling of any powder that is not incorporated into the printed part. If a residue remains after the vaporization of the volatile material 313, the residue may be chosen for adding desirable properties to the 3D object layer 345 and/or the 3D object 105. The volatile material may vaporize or decompose to gasses at a temperature below the melting point of the powder. In an example, the volatile material may vaporize or decompose to gasses at a temperature significantly below the melting point of the powder. In an example, the powder on the powder bed 104 may not undergo any physical or chemical changes during the vaporization of the volatile material 313.

In operation 260, it is determined whether or not all layers of the 3D object 105 have been processed. In response to determining that one or more layer of the 3D object 105 have not been processed, in operation 210, the spreader 106 may spread another layer of powder 342, from the powder supply 103, over the previous layer of powder 315 including the 3D object layer 345. In some examples, the powder that is spread over the layer of powder 315 may cover the trench 330 that was formed in operation 240, but this powder 341 is not part of the 3D object layer 345 and is easily removed later in the process.

Operations 210 to operation 260 are repeatedly performed till all the layers of the 3D object 105 have been processed and a stack of 3D object layers making up the 3D object are created.

In operation 270, in response to determining that all the layers of the 3D object 105 have been processed, the extra powder is discarded from the powder bed 104 and the stacked 3D object layers are further processed. In some examples, the discarded powder from the powder bed may be removed and reused for other AM processes.

In operation 280, the stacked 3D object layers are fused (e.g., sintered) in the furnace 109 to obtain the 3D object 105 using the fuser 170. In some examples, further post processing may be performed on the 3D object 105, as described above.

Figure 4:
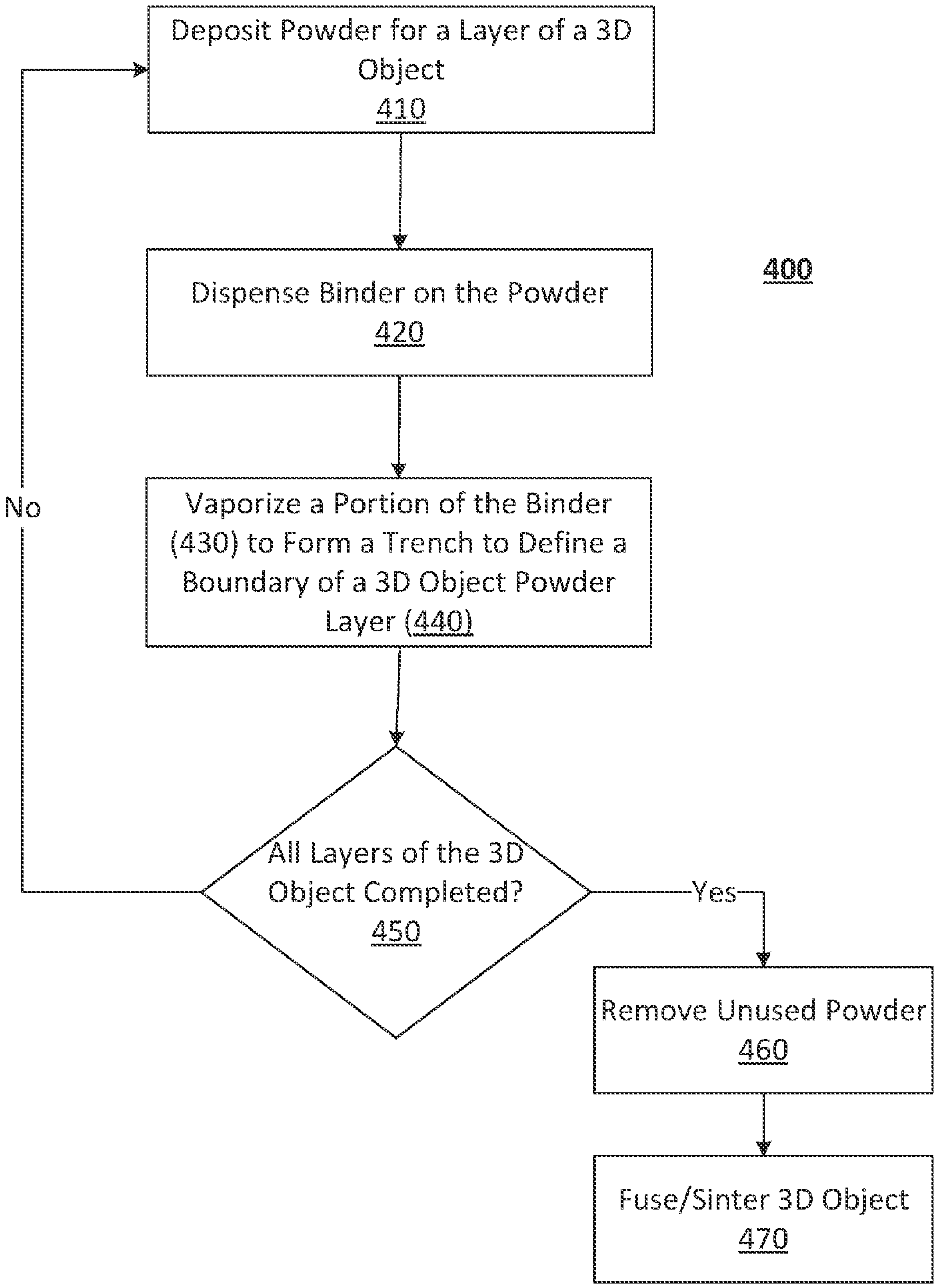
FIG. 4 is a diagram illustrating an example of a method of AM manufacturing, in accordance with implementations described herein.

FIG. 4 is a diagram illustrating an example of an AM manufacturing method 400, in accordance with implementations described herein. FIG. 5 is a diagram illustrating an example of the layers of a 3D object and the method of manufacturing the 3D object illustrated in FIG. 4. The method of FIG. 4 may be described in combination with the layers of the 3D object illustrated in FIG. 5. Although FIG. 4 illustrates an example of operations in sequential order, it will be appreciated that this is merely an example, and that additional or alternative operations may be included. Further, the operations of FIG. 4 and related operations may be executed in a different order than that shown, or in a parallel or overlapping fashion. Descriptions of many of the operations of FIGS. 1-3 are applicable to similar operations of FIG. 4, thus these descriptions of FIGS. 1-3 are incorporated herein by reference. These descriptions may not be repeated for brevity.

In operation 410, the spreader 106 may spread a layer of powder 515, from the powder supply 103, across the powder bed 104. The layer of powder may have an upper surface 511 and a lower surface 512, and a thickness of the layer of powder may be t2. In an example, the powder bed 104 may be misted with an aqueous solution before spreading the layer of powder 515.

In operation 420, a small amount of binder 513 is disposed on the upper surface 511 of the layer of powder 515 on the powder bed 104. In some examples, the binder 513 may be added on the upper surface 511 of the layer of powder 515 by inkjet printing, where the binder 513 is delivered by the nozzle 501. In some examples, the nozzle 501 may be a nozzle of the print head 160. In some examples, binder 513 may penetrate at least one layer thickness, i.e. t2, of the layer of powder 515 that is spread on the powder bed 104.

In some examples, the binder 513 may be patterned on the upper surface 511 of the layer of powder 515 to define a boundary region 525 of a 3D object in the layer of powder 515. The boundary of the 3D object powder layer may be based on a 3D model of the 3D object 105 that is being created. The 3D object 105 may be divided into a number of layers that makeup the 3D object 105. Each layer of the 3D object may be referred to as the 3D object layer. The 3D object powder layer may be a layer of powder on the powder bed 104, such as for example, layer of powder 515 or layer of powder 542 in FIG. 5, which is transformed to a corresponding 3D object layer that collectively make up the 3D object. In some examples, the 3D object may be formed from a single layer (e.g., a 2D object), instead of the multi-layer process described above.

In operation 430, a focused energy beam 520 may be scanned over the boundary region 525 of the 3D object powder layer of the 3D object. In some examples, the focused energy beam 520 may quickly convert the binder 513 disposed in the boundary region 525 to a gas. The rapid gas formation generates a force on the particles of the layer of powder 515 in the boundary region 525 that ejects them from the boundary region 525.

In some examples, the focused energy beam 520 is a tightly focused beam, such as a laser beam, so that the affected area is minimized. In some examples, the focused energy beam 520 is created using a diode laser in a pulsed mode.

In some examples, the focused energy beam 520 may be scanned by mechanically moving the powder bed 104 and/or energy source to achieve relative motion. In some examples, the focused energy beam 520 may be scanned by using a mirror system 502 such as a galvanometer to steer an energy beam over the powder bed 104. In the case of an electron beam, the focused energy beam 520 may be scanned using electrical fields to steer the beam.

In some examples, the energy source for the focused energy beam 520 may be continuous. In some examples, the energy source for the focused energy beam 520 may be pulsed. In some examples, the pulsed source may be effective because the short pulse of heat may more readily vaporize the binder 513 with any excess heat being dissipated to the surrounding powder in the layer of powder 515 with minimal net heating.

In some examples, one-dimensional or two-dimensional array of energy sources 502 that are either stationary or translating relative to the powder bed 104 may be used to produce the focused energy beam 520. Such a configuration may be selectively illuminated to vaporize the binder 513 in select locations. The use of a large array may improve performance and/or reduce costs.

In some examples, the focused energy beam 520 may be absorbed by the binder 513 to minimize heating of the powder on the powder bed 104.

In operation 440, the vaporization of the binder 513 may create a trench 530, i.e., a physical gap between the region of the powder bed layer that will form the 3D object powder layer and the excess powder in the layer of powder 515 over the rest of the powder bed 104. In some examples, a depth of the trench 530 may be equal to t2, i.e. the depth of the layer of powder 515 that is spread on the powder bed 104. In some examples, the depth of the trench 530 may be substantially equal to t2, i.e. the depth of the layer of powder 515 that is spread on the powder bed 104. In some examples, if the powder of the powder bed 104 is melted or fused, the trench 330 may ensure that adjacent powder is not incorporated into the surface of the 3D object layer, thereby improving the 3D object's dimensional accuracy and surface finish.

In an example, the binder 513 may fuse or harden the 3D object powder layer 535 to form the 3D object layer 545. In the example illustrated in FIG. 5, binder 513 is disposed on only one side of the trench 530. However, this orientation of the binder 513 and the trench 530 is for illustration only, and the binder 513 may be disposed in various orientations, such as on both sides of the trench 530, all around the trench 530, or on a portion of the region around the trench 530, without deviating from the spirit and scope of the illustrative examples described.

In an example, the binder 513 may be such that it does not leave any residue behind after vaporization, thus supporting recycling of any powder that is not incorporated into the printed part. If a residue remains after the vaporization of the binder 513, the residue may be chosen for adding desirable properties to the 3D object layer 545 and/or the 3D object 105. The binder 513 may vaporize or decompose to gasses at a temperature below the melting point of the powder. In an example, the binder 513 may vaporize or decompose to gasses at a temperature significantly below the melting point of the powder. In an example, the powder on the powder bed 104 may not undergo any physical or chemical changes during the vaporization of the binder 513.

In operation 450, it is determined whether or not all layers of the 3D object 105 have been processed. In response to determining that one or more layer of the 3D object 105 have not been processed, in operation 410, the spreader 106 may spread another layer of powder 542, from the powder supply 103, over the previous layer of powder 515 including the 3D object layer 545. In some examples, the powder that is spread over the layer of powder 515 may cover the trench 530 that was formed in operation 240, but this powder 541 is not part of the 3D object layer 545 and is easily removed later in the process.

Operations 410 to operation 450 are repeatedly performed till all the layers of the 3D object 105 have been processed and a stack of 3D object layers making up the 3D object 105 are created.

In operation 460, in response to determining that all the layers of the 3D object 105 have been processed, the extra powder is removed from the powder bed 104 and the stacked 3D object layers are further processed. In an example, the extra powder is recycled.

In operation 470, the stacked 3D object layers are fused or sintered in the furnace 109 to obtain the 3D object 105 using the fuser 170. In some examples, further post processing may be performed on the 3D object 105, as described above.

Figure 6:
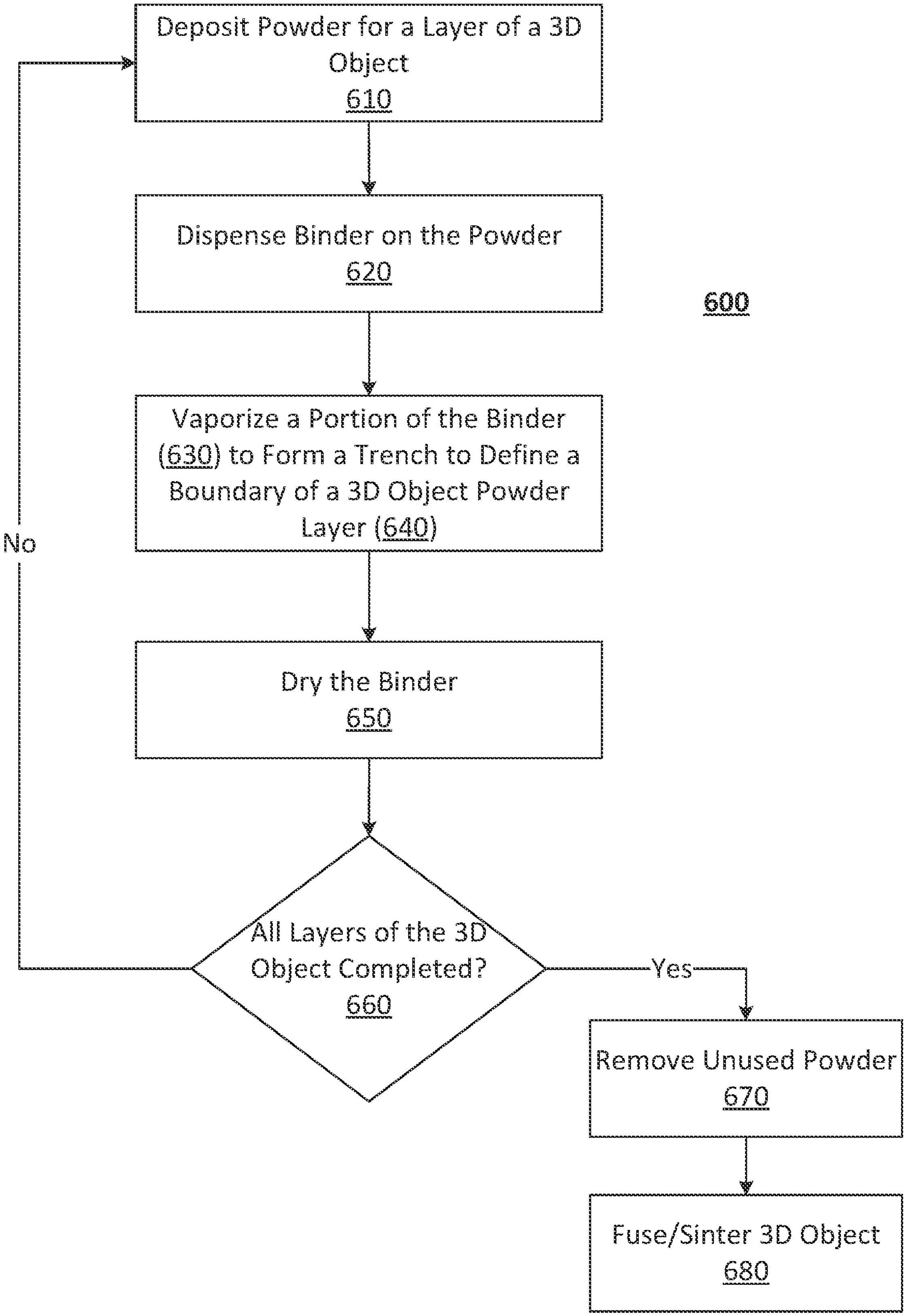
FIG. 6 is a diagram illustrating an example of a method of AM manufacturing, in accordance with implementations described herein.
Figure 7A:
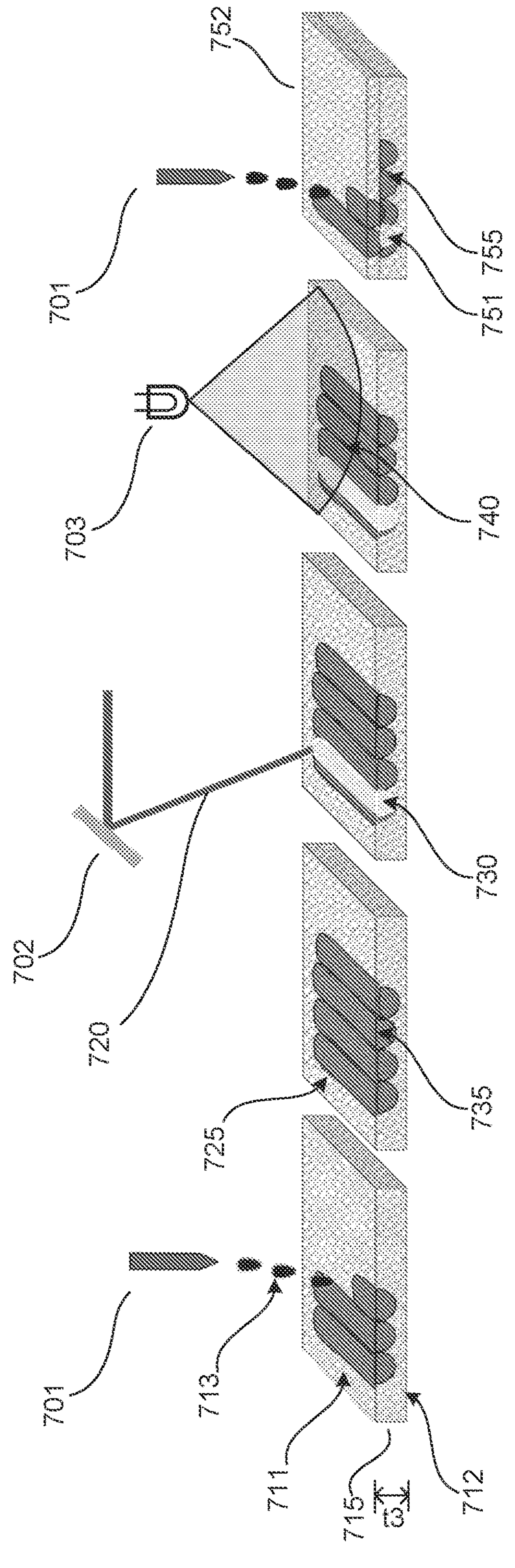
FIGS. 7A and 7B are diagrams illustrating an example of a method of manufacturing a 3D object, in accordance with implementations described herein.
Figure 7B:
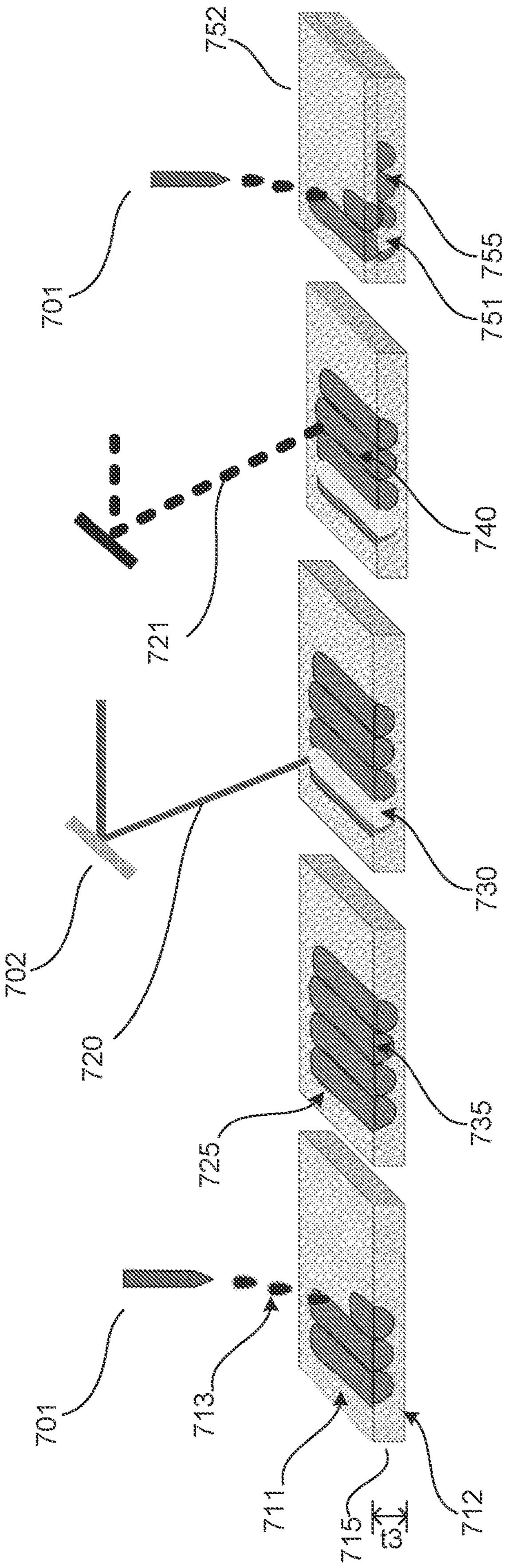

FIG. 6 is a diagram illustrating an example of an AM manufacturing method 600, in accordance with implementations described herein. FIGS. 7A and 7B are diagrams illustrating an example of the layers of a 3D object and the method of manufacturing the 3D object illustrated in FIG. 6. The method of FIG. 6 may be described in combination with the layers of the 3D object illustrated in FIGS. 7A and 7B. Although FIG. 6 illustrates an example of operations in sequential order, it will be appreciated that this is merely an example, and that additional or alternative operations may be included. Further, the operations of FIG. 6 and related operations may be executed in a different order than that shown, or in a parallel or overlapping fashion. Descriptions of many of the operations of FIGS. 1-5 are applicable to similar operations of FIG. 6, thus these descriptions of FIGS. 1-5 are incorporated herein by reference. These descriptions may not be repeated for brevity.

In operation 610, the spreader 106 may spread a layer of powder 715, from the powder supply 103, across the powder bed 104. The layer of powder may have an upper surface 711 and a lower surface 712, and a thickness of the layer of powder may be t3. In an example, the powder bed 104 may be misted with an aqueous solution before spreading the layer of powder 715.

In operation 620, a small amount of binder 713 is disposed on the upper surface 711 of the layer of powder 715 on the powder bed 104. In some examples, the binder 713 may be an energy absorbing fluid or a radiation absorber, such as an ink or pigment that absorbs heat at a greater rate than a surface of the layer of powder 715. In some examples, the binder may be an aqueous solution including black ink. In some examples, the binder 713 (such as an energy absorbing fluid) may be added on the upper surface 711 of the layer of powder 715 by inkjet printing, where the binder 713 (such as an energy absorbing fluid) is delivered by the nozzle 701. In some examples, the nozzle 701 may be a nozzle of the print head 160. In some examples, binder 713 (such as an energy absorbing fluid) may penetrate at least one layer thickness, i.e., t3, of the layer of powder 515 that is spread on the powder bed 104.

In some examples, the binder 713 (such as an energy absorbing fluid) may be patterned on the upper surface 711 of the layer of powder 715 to define a boundary region 725 of a 3D object powder layer 735 of the 3D object 105. The boundary of the 3D object powder layer may be based on a 3D model of the 3D object 105 that is being created. The 3D object 105 may be divided into a number of layers that makeup the 3D object 105. Each layer of the 3D object may be referred to as the 3D object layer. The 3D object powder layer may be a layer of powder on the powder bed 104, such as for example, layer of powder 715 or layer of powder 752 in FIGS. 7A and 7B, which is transformed to a corresponding 3D object layer that collectively make up the 3D object. In some examples, the 3D object may be formed in a single layer, instead of the multi-layer process described above.

In operation 630, a focused energy beam 720 may be scanned over the boundary region 725 of the 3D object powder layer of the 3D object. In some examples, the focused energy beam 720 may quickly convert the binder 713 (such as an energy absorbing fluid) disposed in the boundary region 725 to a gas. The rapid gas formation generates a force on the particles of the layer of powder 715 in the boundary region 725 that ejects them from the boundary region 725.

In some examples, the focused energy beam 720 is a tightly focused beam, such as a laser beam, so that the affected area is minimized. In some examples, the focused energy beam 520 is created using a diode laser in a pulsed mode.

In some examples, the focused energy beam 720 may be scanned by mechanically moving the powder bed 104 and/or energy source to achieve relative motion. In some examples, the focused energy beam 720 may be scanned by using a mirror system 702 such as a galvanometer to steer an energy beam over the powder bed 104. In the case of an electron beam, the focused energy beam 720 may be scanned using electrical fields to steer the beam.

In some examples, the energy source for the focused energy beam 720 may be continuous. In some examples, the energy source for the focused energy beam 720 may be pulsed. In some examples, the pulsed source may be effective because the short pulse of heat may more readily vaporize the binder 713 (such as an energy absorbing fluid) with any excess heat being dissipated to the surrounding powder in the layer of powder 715 with minimal net heating.

In some examples, one-dimensional or two-dimensional array of energy sources 702 that are either stationary or translating relative to the powder bed 104 may be used to produce the focused energy beam 720. Such a configuration may be selectively illuminated to vaporize the binder 713 (such as an energy absorbing fluid) in select locations. The use of a large array may improve performance and/or reduce costs.

In some examples, the focused energy beam 720 may be absorbed by the binder 713 (such as an energy absorbing fluid) to minimize heating of the powder on the powder bed 104.

In operation 640, the vaporization of the binder 713 (such as an energy absorbing fluid) may create a trench 730, i.e., a physical gap between the region of the powder bed layer that will form the 3D object powder layer and the excess powder in the layer of powder 715 over the rest of the powder bed 104. In some examples, a depth of the trench 730 may be equal to t3, i.e., the depth of the layer of powder 715 that is spread on the powder bed 104. In some examples, the depth of the trench 730 may be substantially equal to t3, i.e. the depth of the layer of powder 715 that is spread on the powder bed 104. In some examples, if the powder of the powder bed 104 is melted or fused, the trench 330 may ensure that adjacent powder is not incorporated into the surface of the 3D object layer, thereby improving the 3D object's dimensional accuracy and surface finish.

In an example, the binder 713 (such as an energy absorbing fluid) may be such that it does not leave any residue behind after vaporization, thus supporting recycling of any powder that is not incorporated into the printed part. If a residue remains after the vaporization of the binder 713 (such as an energy absorbing fluid), the residue may be chosen for adding desirable properties to the 3D object layer 755 and/or the 3D object 105. The binder 713 (such as an energy absorbing fluid) may vaporize or decompose to gasses at a temperature below the melting point of the powder. In an example, the binder 713 (such as an energy absorbing fluid) may vaporize or decompose to gasses at a temperature significantly below the melting point of the powder. In an example, the powder on the powder bed 104 may not undergo any physical or chemical changes during the vaporization of the binder 713 (such as an energy absorbing fluid).

In operation 650, the drier 703 may produce heat or light to dry the binder material remaining on the layer of powder 715. In some examples, as illustrated in FIG. 7A, the drier 150 may be a heat source, such as, for example, a heat lamp. In some examples, as illustrated in FIG. 7A, the drier 150 may be a light source, such as, for example, a light bulb or a projector. In an example, the binder 713 (such as an energy absorbing fluid) may absorb the heat or light from the drier 703 more readily than the surrounding layer of powder 715 to fuse or harden the 3D object powder layer 735 to form the 3D object layer 545.

In some examples, as illustrated in FIG. 7B, a focused energy beam 721 may produce heat to dry the binder material remaining on the layer of powder 715. The power rating of the focused energy beam 721 may be different than the power rating of the focused energy beam 720. In some examples, the power output from the focused energy beam 721 may be sufficient to be absorbed by the binder 713 (such as an energy absorbing fluid) to fuse or harden the 3D object powder layer 735 to form the 3D object layer 545. The power output from the focused energy beam 721, however, may not be so high as to melt the layer of powder 715. Many of the description of the focused energy beam 720 are also applicable to the focused energy beam 721, thus these descriptions of the focused energy beam 720 are incorporated herein by reference. These descriptions may not be repeated for brevity.

In an example, the binder 713 (such as an energy absorbing fluid) may fuse or harden the 3D object powder layer 740 to form the 3D object layer 755.

In the example illustrated in FIGS. 7A and 7B, binder 713 (such as an energy absorbing fluid) is disposed on only one side of the trench 730. However, this orientation of the binder 713 (such as an energy absorbing fluid) and the trench 730 is for illustration only, and the binder 713 (such as an energy absorbing fluid) may be disposed in various orientations, such as on both sides of the trench 730, all around the trench 730, or on a portion of the region around the trench 730, without deviating from the spirit and scope of the illustrative examples described. In other words, the binder 713 (such as an energy absorbing fluid) can disposed in an area (e.g., in the vicinity) where trenching will be performed.

In operation 660, it is determined whether or not all layers of the 3D object 105 have been processed. In response to determining that one or more layer of the 3D object 105 have not been processed, in operation 610, the spreader 106 may spread another layer of powder 752, from the powder supply 103, over the previous layer of powder 715 including the 3D object layer 755. In some examples, the powder that is spread over the layer of powder 715 may cover the trench 730 that was formed in operation 240, but this powder 751 is not part of the 3D object layer 755 and is easily removed later in the process.

Operations 610 to operation 660 are repeatedly performed till all the layers of the 3D object 105 have been processed and a stack of 3D object layers making up the 3D object 105 are created.

In operation 670, in response to determining that all the layers of the 3D object 105 have been processed, the extra powder is removed from the powder bed 104 and the stacked 3D object layers are further processed. In an example, the extra powder is recycled.

In operation 680, the stacked 3D object layers are fused or sintered in the furnace 109 to obtain the 3D object 105 using the fuser 170. In some examples, further post processing may be performed on the 3D object 105, as described above.

FIGS. 8-14 are diagrams illustrating example results of methods of AM manufacturing, in accordance with implementations described herein. In the examples illustrated in FIGS. 8-14, results are presented of a focused energy beam being scanned to define shapes in a 3D object powder layer of the 3D object disposed on the powder bed. In the examples illustrated in FIGS. 8-14, the focused energy beam is a laser beam created using a diode laser in a pulsed mode.

Figure 8:
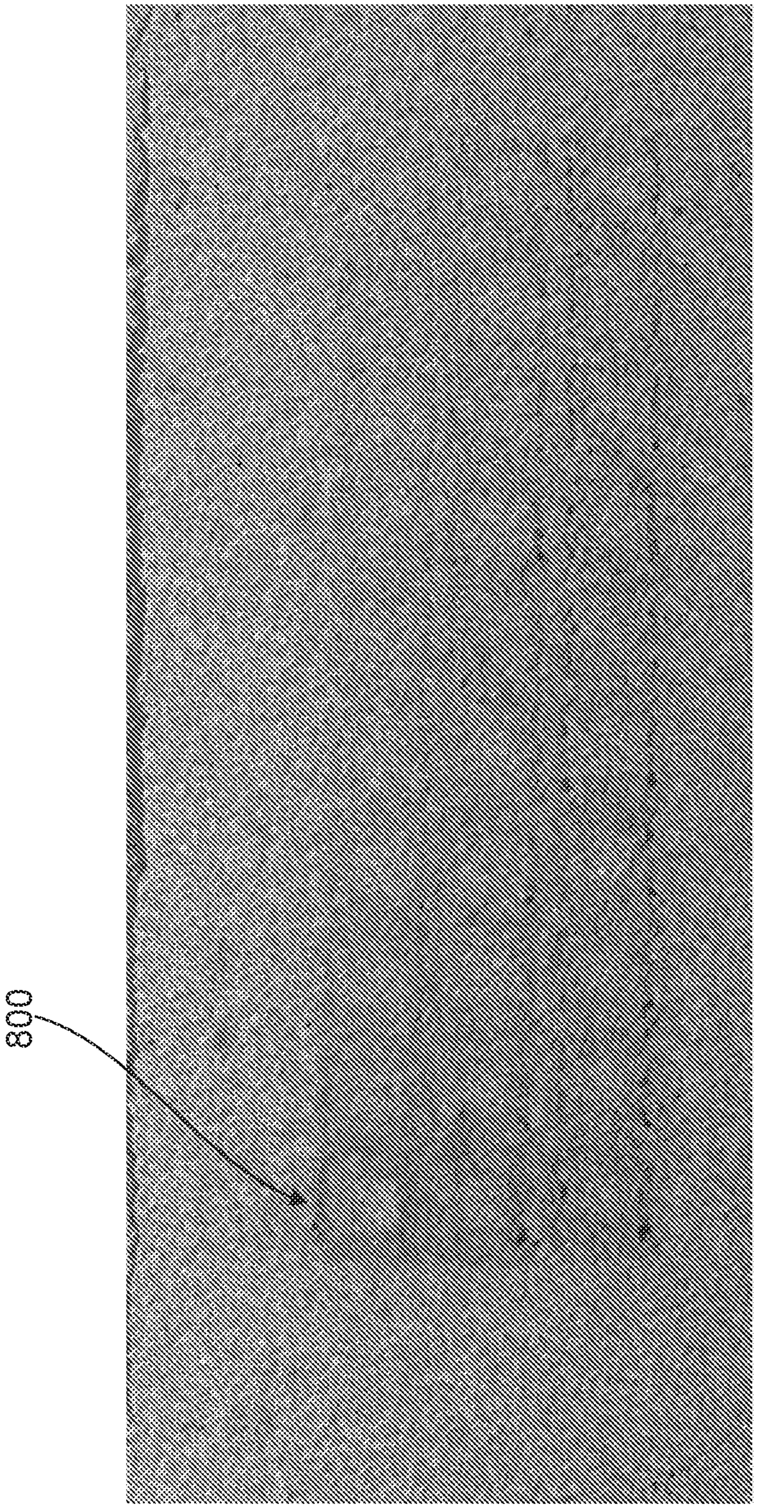
FIGS. 8-14 are diagrams illustrating example results of methods of AM manufacturing, in accordance with implementations described herein.
Figure 9:
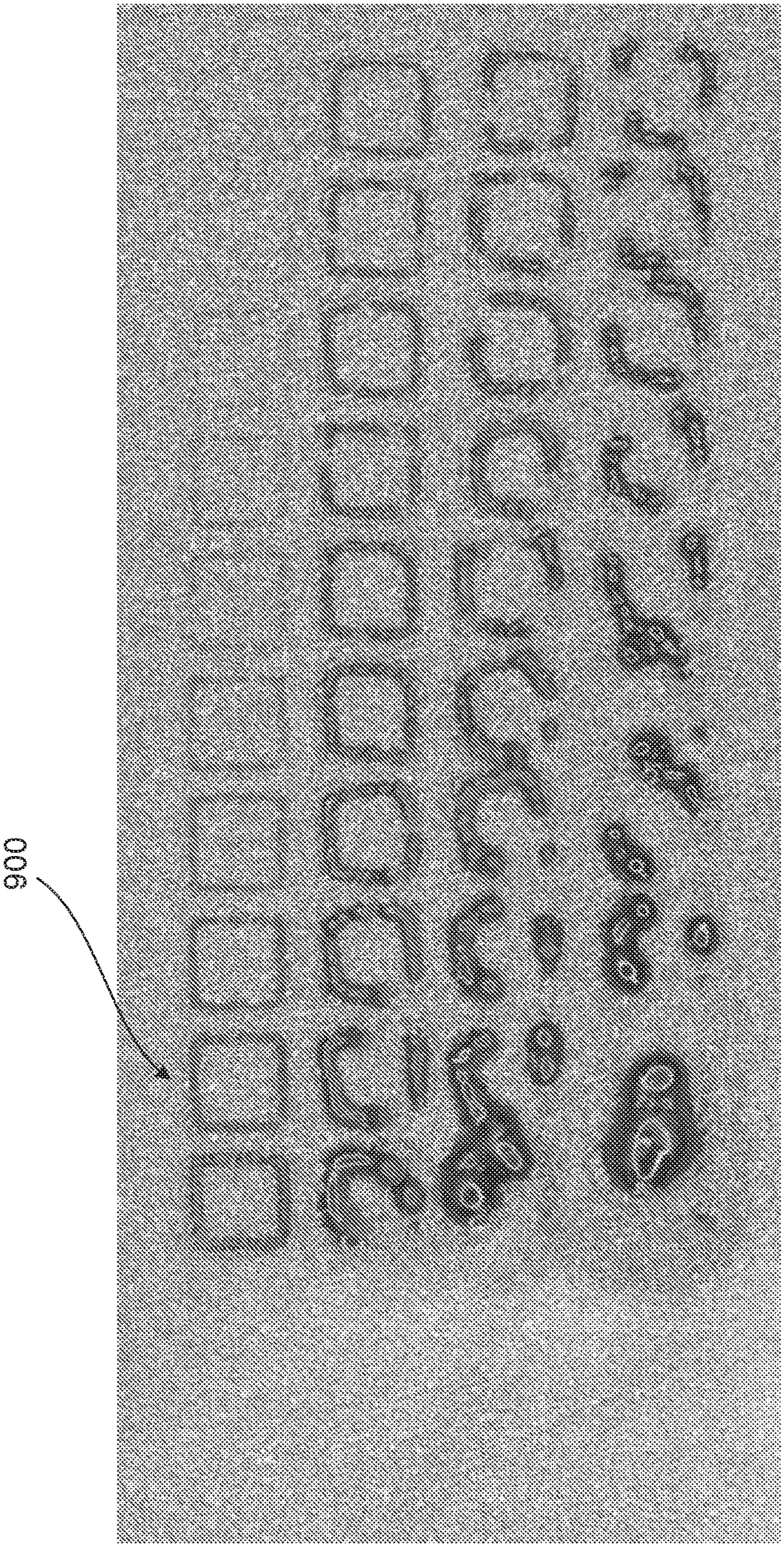

FIGS. 8-9 illustrate an example where an array of 1.5 mm by 1.5 mm squares 800 and 900 was lased into the surface of two powder beds filled with Nylon 12 powder. FIG. 8 illustrates examples of the wetted powder bed, and FIG. 9 illustrates examples of a dry powder bed.

In the array of squares illustrated in FIGS. 8-9, the print speed and the lased power were varied. The print speed was varied in 100 mm/min increments along the x-axis (left to right in the figures) with the leftmost squares lased at speeds of 100 mm/min and the rightmost squares lased at speeds of 1000 mm/min. The laser power was varied in 5% increments along the y-axis (top to bottom in the figures) with the topmost squares lased at 5% laser power and the bottommost squares lased at 20% laser power.

A second experiment was performed on wetted Nylon 12 powder in which a similar array was lased, but with increased speeds (up to 1500 mm/min) and laser power (up to 30%). Individual squares illustrated in FIGS. 10-14 from the array was imaged using a Keyence digital microscope with 3D microscope imaging to generate 3D surface models.

Figure 10:
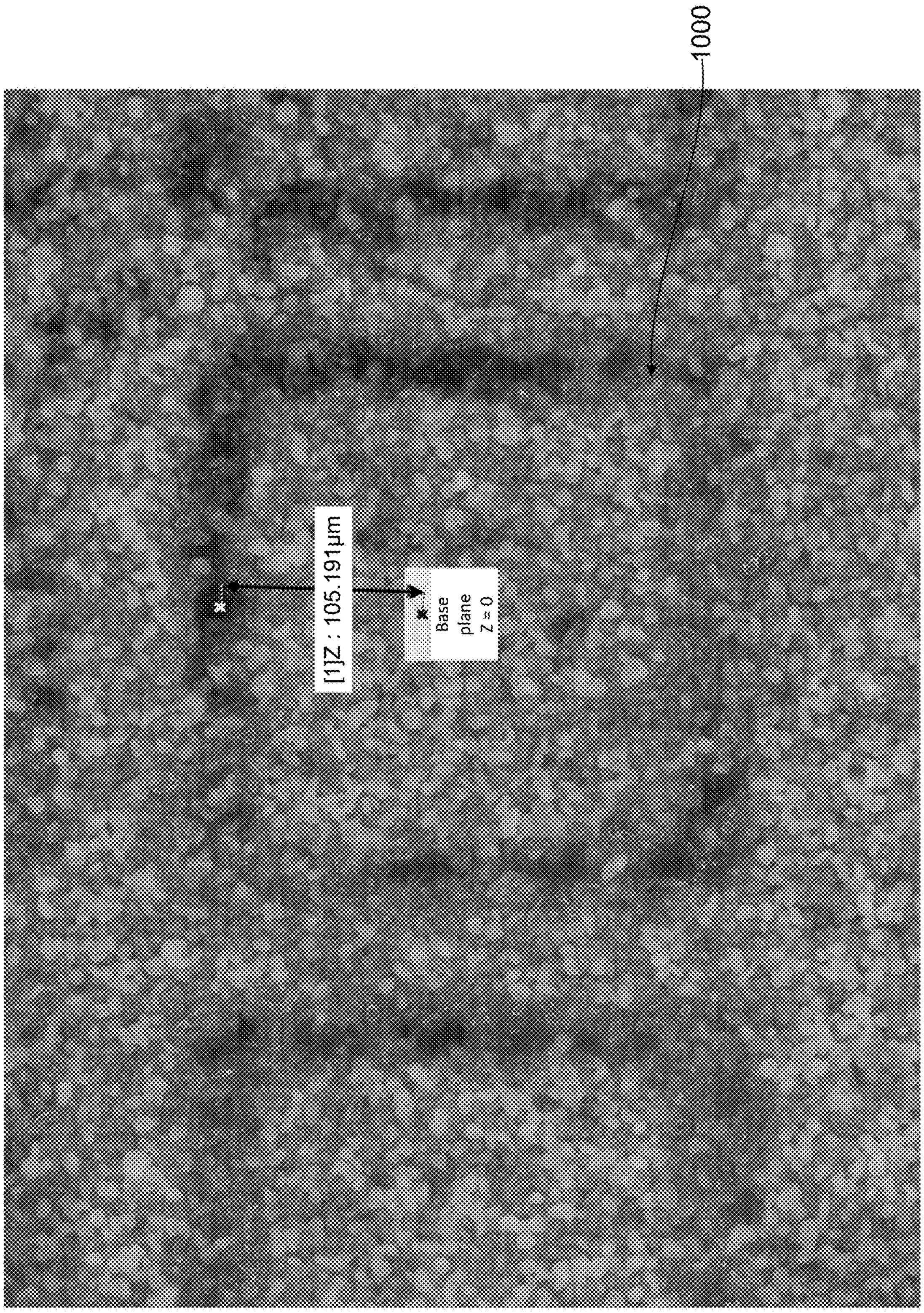
Figure 11:
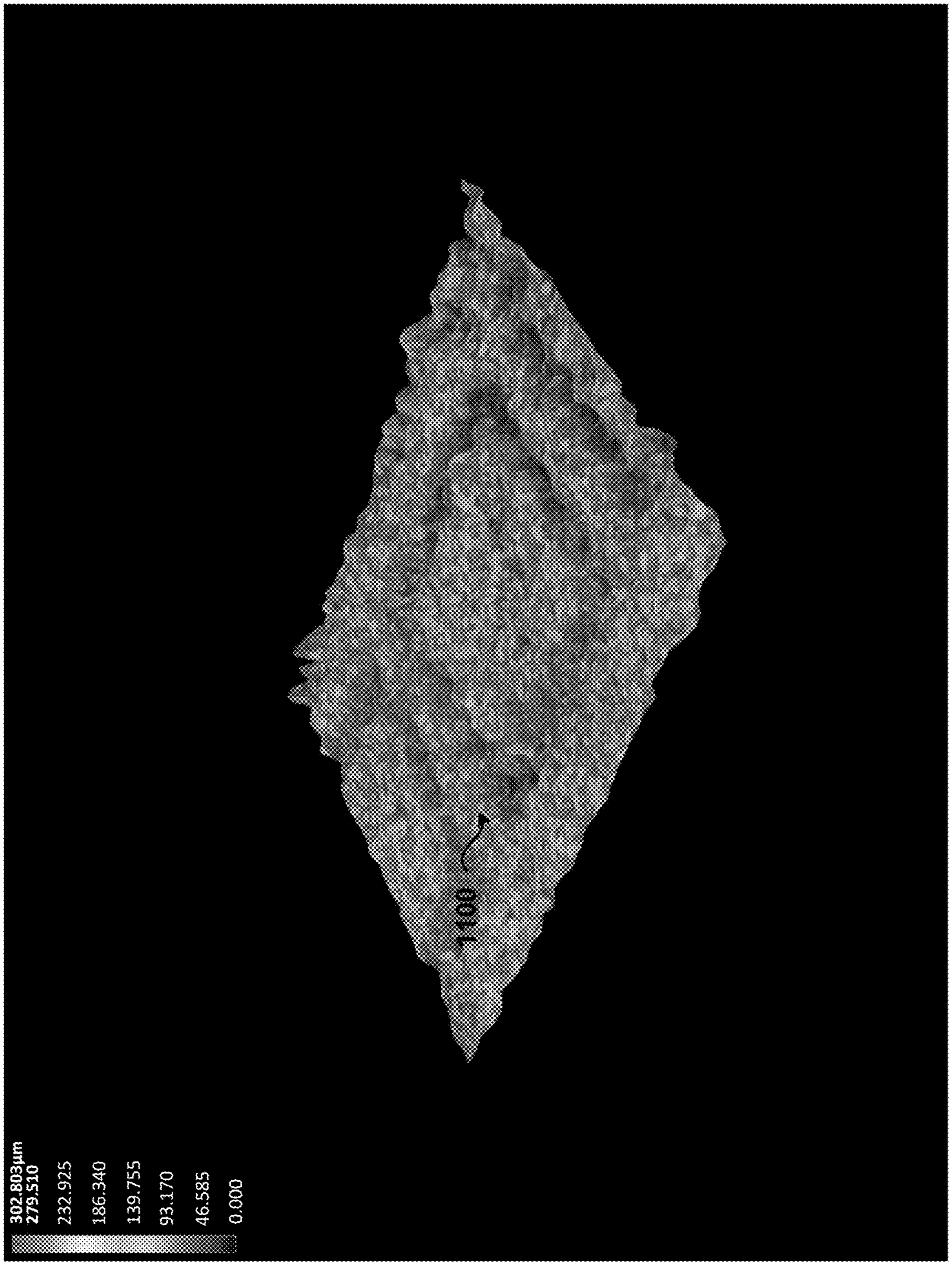
Figure 12:
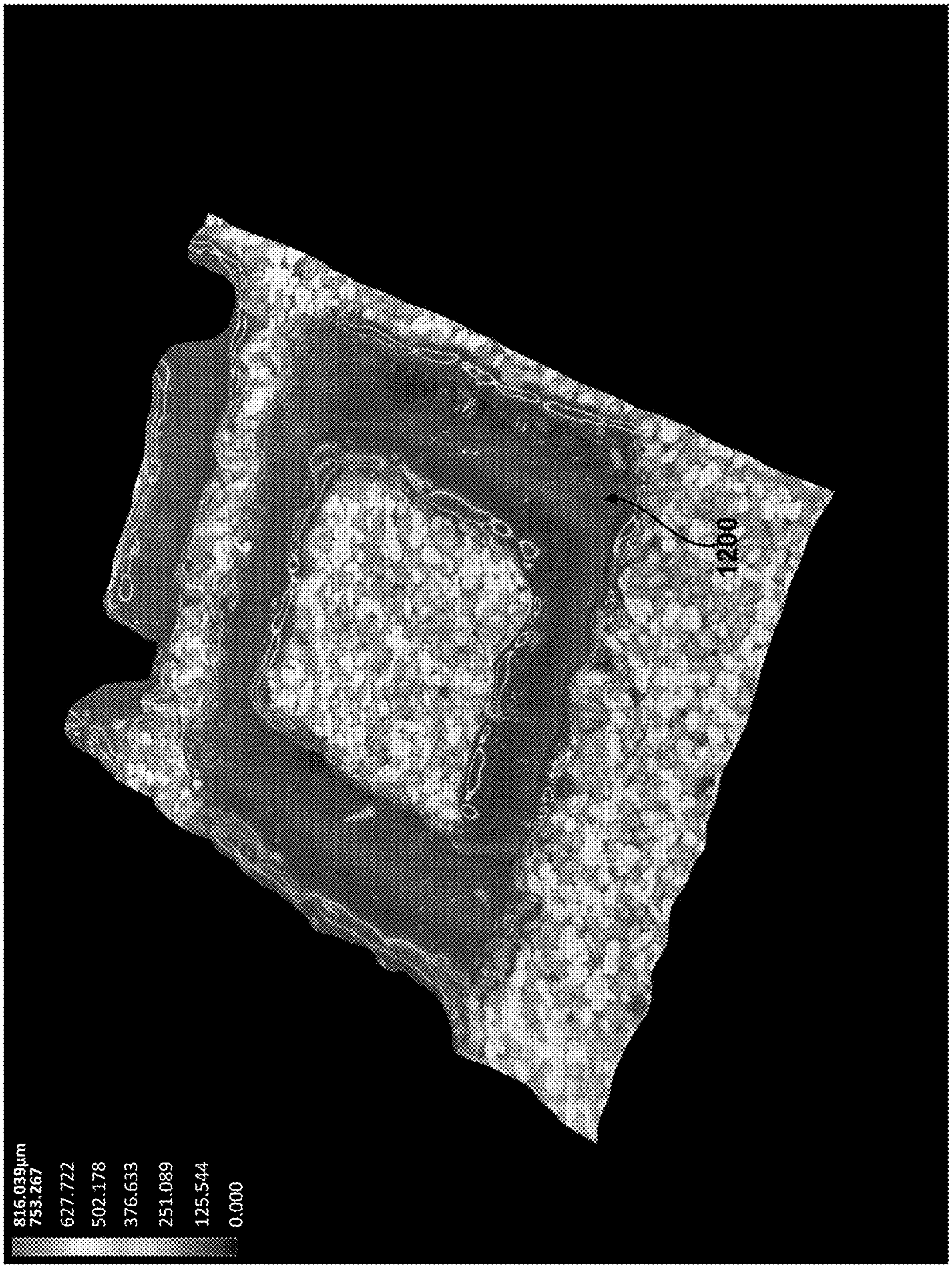
Figure 13:
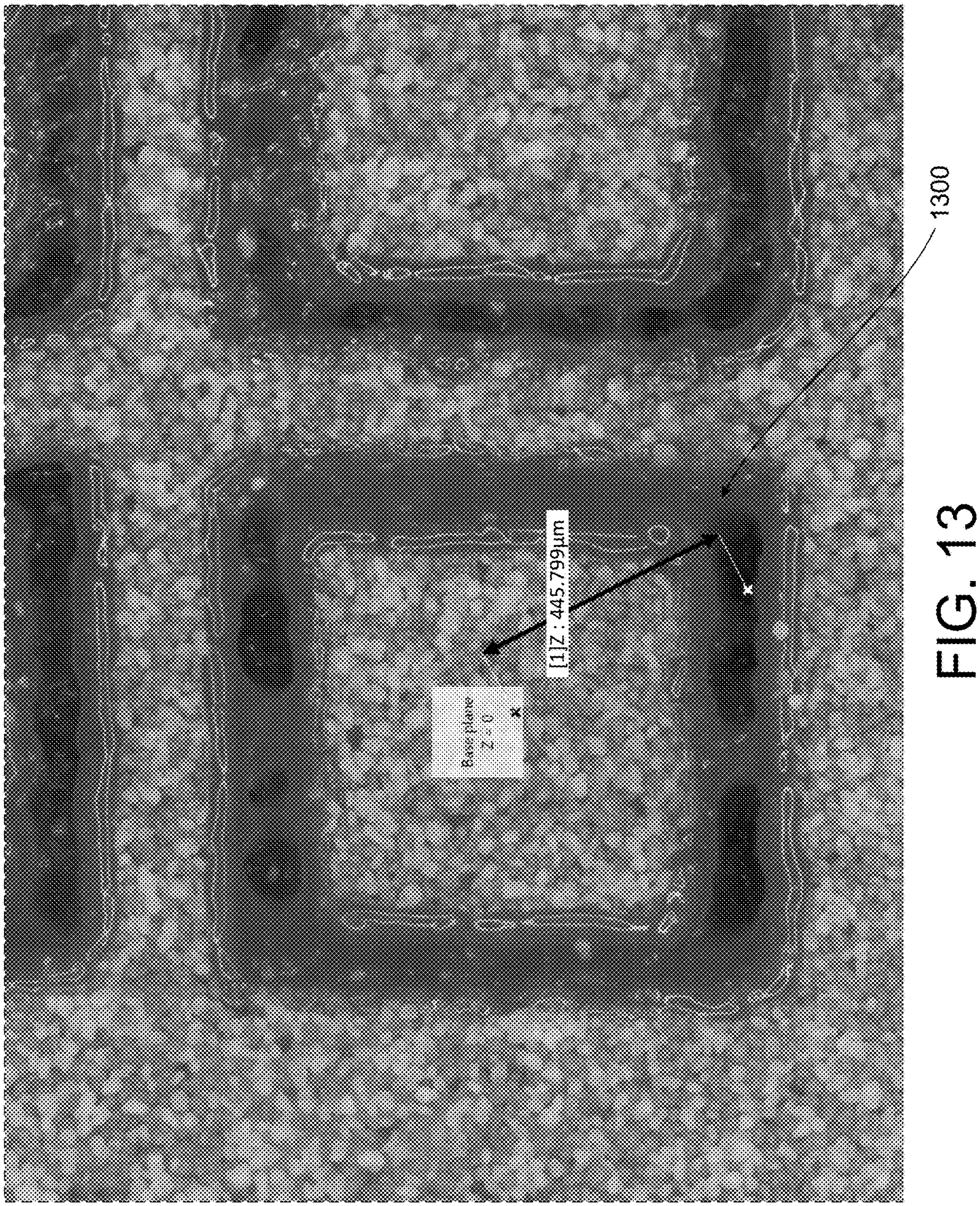
Figure 14:
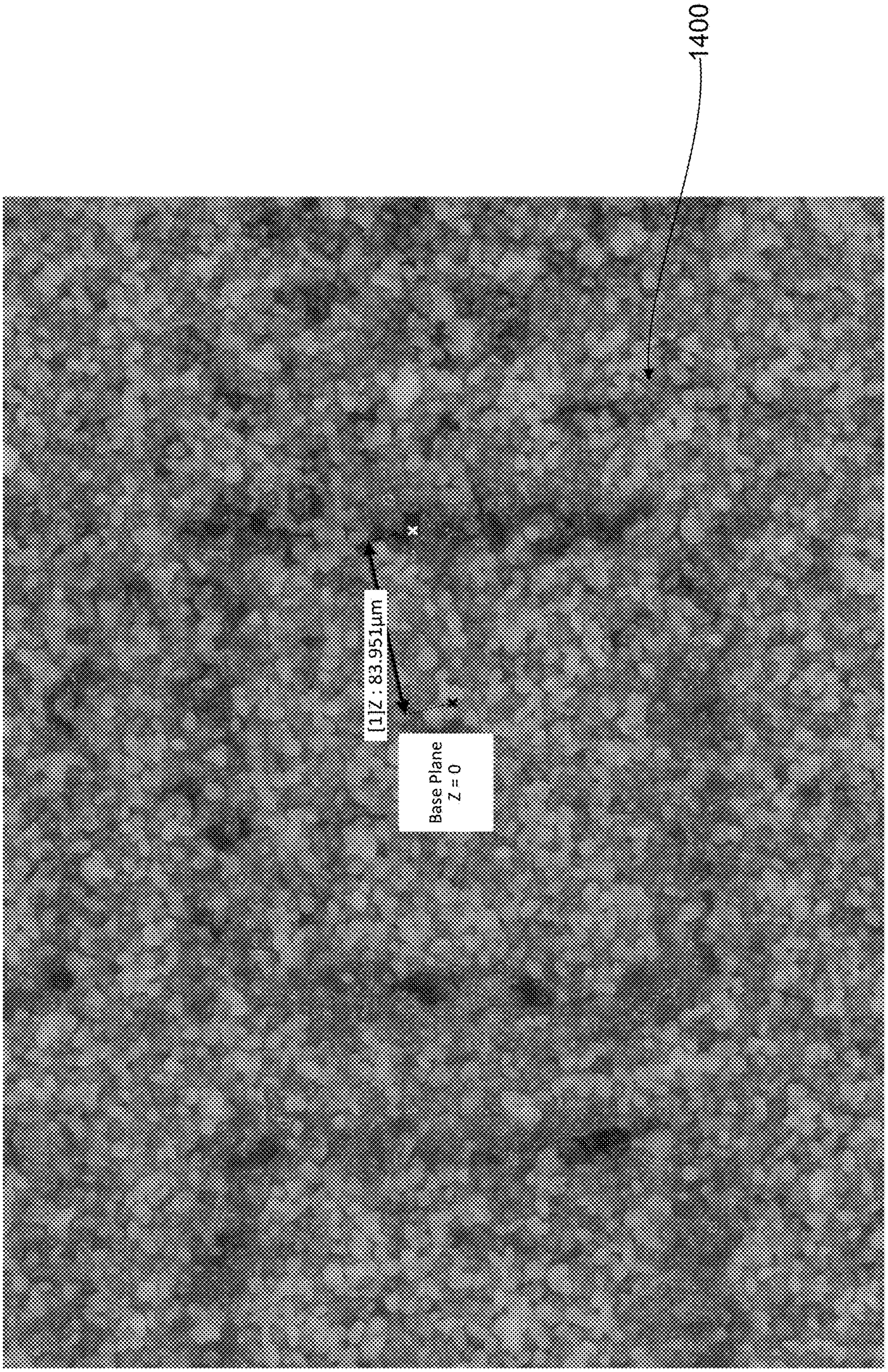

FIGS. 10-11 illustrate examples of a squares 1000 and 1100 that was lased using speeds of 1000 mm/min and 30% laser power, producing an appropriately deep trench for most AM processes (100 um) without melting material at the edges of the trench. FIGS. 12-13 illustrate examples of a squares 1200 and 1300 that was lased using speeds of 100 mm/min and 30% laser power, producing a far deeper trench than needed for most AM processes and melting some of the polymer particles, which formed smooth, reflective surfaces at the edges of the trench. FIG. 12 illustrates an example where some melting of the surface powder has taken place. In some examples, the melting of the surface powder may further improve the surface smoothness and provide an improves surface finish. FIG. 14 illustrates an example of a square 1400 that was lased using speeds of 1500 mm/min and 30% laser power, producing a trench that was shallower than desired (80 um) without melting material at the edges of the trench.

It will be understood that, in the foregoing description, when an element is referred to as being on, connected to, electrically connected to, coupled to, or electrically coupled to another element, it may be directly on, connected or coupled to the other element, or one or more intervening elements may be present. When an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

Implementations of the various techniques described herein may be implemented in (e.g., included in) digital electronic circuitry, or in computer hardware, firmware, software, or in combinations of them. Some implementations may be implemented using various semiconductor processing and/or packaging techniques.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method of forming an object, the method comprising:
forming a layer of powder;
dispensing a volatile fluid on the layer of the powder;
vaporizing the volatile fluid by applying an energy beam to form a trench that defines a boundary of a three-dimensional (3D) object powder layer of the object, the 3D object powder layer corresponding to a portion of the layer of the powder defined by the boundary; and
adding a binder to the 3D object powder layer.

2. The method of claim 1, wherein the dispensing of the volatile fluid comprises dispersing the volatile fluid to penetrate a depth of the trench.

3. The method of claim 1, wherein the vaporizing of the volatile fluid comprises ejecting powder particles of the powder from the boundary based on an expansive force exerted on the powder particles by the vaporizing of the volatile fluid.

4. The method of claim 1, wherein the forming of the layer of powder comprises depositing a layer of powder onto a powder bed.

5. The method of claim 1, further comprising discarding a portion of the layer of powder outside the boundary of the 3D object powder layer.

6. The method of claim 1, wherein the dispensing of the volatile fluid comprises dispensing the volatile fluid over a portion of the layer of the powder.

7. The method of claim 1, wherein the dispensing of the volatile fluid comprises dispensing the volatile fluid over an entire surface area of an upper surface of the layer of the powder.

8. The method of claim 1, wherein the dispensing of the volatile fluid comprises spraying a mist of volatile fluid over an upper surface of the layer of the powder.

9. The method of claim 1, wherein the layer of the powder comprises a first layer of the powder, the 3D object powder layer comprises a first 3D object powder layer, and the volatile fluid is a first portion of volatile fluid, and the method further comprises:
forming a second layer of the powder over an upper surface of the first layer of the powder;
dispensing a second portion of the volatile fluid on the second layer of the powder;
vaporizing the second portion of the volatile fluid by applying another energy beam to form a second trench that defines a boundary of a second 3D object powder layer of the object, the second 3D object powder layer corresponding to a portion of the second layer of the powder defined by the boundary of the second 3D object powder layer;
adding another binder to the second 3D object powder layer; and forming the object based on fusing the first 3D object powder layer and the second 3D object powder layer.

10. The method of claim 9, wherein the fusing of the first 3D object powder layer and the second 3D object powder layer comprises heating of the first 3D object powder layer and the second 3D object powder layer.

11. The method of claim 1, wherein the volatile fluid vaporizes at a temperature less than a melting point of the powder.

12. The method of claim 1, wherein the applying of the energy beam comprises applying a pulsed laser beam.

13. The method of claim 1, wherein the applying of the energy beam comprises applying a continuous laser beam.

14. A method of forming an object, the method comprising:

forming a layer of powder;

dispensing a binder on the layer of the powder; and vaporizing a portion of the binder by patterning an energy beam to form a trench that defines a boundary of a three-dimensional (3D) object powder layer of the object, the 3D object powder layer corresponding to a portion of the layer of the powder defined by the boundary.

15. The method of claim 14, wherein the vaporizing of the portion of the binder comprises ejecting powder particles of the powder from the boundary based on an expansive force exerted on the powder particles by the vaporizing of the binder.

16. A method of forming an object, the method comprising:

forming a first layer of powder;

dispensing a first portion of a volatile fluid on the first layer of the powder;

vaporizing a portion of the first portion of the volatile fluid by patterning an energy beam to form a first trench that defines a first boundary of a first 3D object powder layer of the object, the first 3D object powder layer corresponding to a portion of the first layer of the powder defined by the first boundary;

forming a second layer of the powder over an upper surface of the first layer of the powder;

dispensing a second portion of the volatile fluid on the second layer of the powder;

vaporizing a portion of the second portion of the volatile fluid by patterning another energy beam to form a second trench that defines a second boundary of a second 3D object powder layer of the object, the second 3D object powder layer corresponding to a portion of the second layer of the powder defined by the second boundary; and forming the 3D object based on fusing the first 3D object powder layer and the second 3D object powder layer.

17. The method of claim 16, further comprising discarding the first layer of the powder and the second layer of the powder outside the first boundary of the first 3D object powder layer and the second boundary of the second 3D object powder layer, respectively.

18. A method of forming an object, the method comprising:

forming a layer of powder;

dispensing a pigment on the layer of the powder;

vaporizing a portion of the pigment by patterning an energy beam to form a trench that defines a boundary of a 3D object powder layer of the object, the 3D object powder layer corresponding to a portion of the layer of the powder defined by the boundary; and drying the pigment on the 3D object powder layer to form a 3D object layer.

19. The method of claim 18, wherein a depth of the trench is substantially equal to a depth of the layer of the powder.

20. The method of claim 18, wherein the pigment absorbs light at a faster rate than the powder, and the drying of the pigment comprises exposing the pigment to a light source.

* * * * *